United States Patent [19]

Trabert et al.

[11] Patent Number: 4,778,848

[45] Date of Patent: Oct. 18, 1988

[54] POLYAMIDE MOULDING COMPOSITIONS HAVING GOOD TOUGHNESS PROPERTIES

[75] Inventors: Ludwig Trabert, Krefeld; Christian Lindner, Cologne, both of Fed. Rep. of Germany

[73] Assignee: Bayer Aktiengesellschaft, Leverkusen, Fed. Rep. of Germany

[21] Appl. No.: 729,211

[22] Filed: May 1, 1985

[30] Foreign Application Priority Data

May 11, 1984 [DE] Fed. Rep. of Germany ....... 3417476

[51] Int. Cl.⁴ .............................................. C08L 77/00
[52] U.S. Cl. ....................................... 525/66; 525/179
[58] Field of Search .................... 525/66, 179, 180, 72

[56] References Cited

U.S. PATENT DOCUMENTS

| | | | |
|---|---|---|---|
| 3,005,795 | 10/1961 | Busse et al. | 525/180 |
| 4,338,406 | 7/1982 | Sanderson et al. | 525/66 |
| 4,338,409 | 7/1982 | Grigo et al. | 525/66 |
| 4,554,320 | 11/1985 | Reimann et al. | 525/183 |

FOREIGN PATENT DOCUMENTS 2822438 12/1978 Fed. Rep. of Germany.
2311814 12/1976 France.

OTHER PUBLICATIONS

Brydson, J. A. Plastics Materials, (London, Iliffe, 1966), pp. 58–59.

*Primary Examiner*—John C. Bleutge
*Assistant Examiner*—A. Carrillo
*Attorney, Agent, or Firm*—Connolly & Hutz

[57] ABSTRACT

The invention relates to thermoplastic moulding compositions consisting of (A) 65–97% by weight of a polyamide and (B) 3–5% by weight of a graft rubber having a gel content of at least 50% by weight and a glass transition temperature below −20° C., the sum of the components A and B being 100% by weight, containing 0.1–1% by weight, preferably 0.25–0.8% by weight, relative to the sum of A and B, of tetrafluoroethylene polymers, and to a process for their preparation.

7 Claims, No Drawings

POLYAMIDE MOULDING COMPOSITIONS HAVING GOOD TOUGHNESS PROPERTIES

The invention relates to thermoplastic moulding compositions having improved toughness properties at low temperatures consisting of a polyamide and crosslinked graft rubbers which belong to the series comprising diene rubbers and acrylate rubbers and which have been obtained by precipitation together with tetrafluoroethylene polymers.

The improvement in the toughness of polyamide moulding compositions caused by graft rubbers is known (DE-OS (German Published Specification) No. 2,758,615, EP-A No. 3,126, DE-OS (German Published Specification) No. 3,101,771 and DE-OS (German Published Specification) No. 3,120,803).

However, these moulding compositions are not satisfactory for important applications, for example in the field of motor vehicles.

Thus it has been found that complicated mouldings are difficult to release from the mould. In particular, the adhesion temperature of the compositions is too low, so that the finished, but still soft, moulded article adheres to the mould and becomes distorted when released from the mould. This applies particularly to polyamide moulding compositions containing a great deal of graft rubber.

As a result of adding the graft polymers to polyamide, the stiffness of the latter is also reduced, and these moulding compositions tend to drip burning particles when exposed to flames.

The polyamide moulding compositions of the present invention, on the other hand, can be released from the mould readily, have a good toughness even at low temperatures and also a high degree of stiffness and do not drip burning particles when exposed to flames. They contain polyamide and a rubber-elastic graft polymer and also a small amount of a tetrafluoroethylene polymer which is incorporated in the form of a mixture with the graft polymer. This mixture is prepared by coagulating a mixture of the aqueous dispersion of the graft polymer and an aqueous dispersion of the tetrafluoroethylene polymer.

It is notable here that even an small amount of tetrafluoroethylene polymer exerts a great influence on the technological properties of the blend.

Polyamide/tetrafluoroethylene polymer mixtures are known (for example DE-AS (German Published Specification) No. 2,703,419, DE-OS (German Published Specification) No. 2,822,438 and EP No. 23,047), but do not have an improved toughness or stiffness. They are prepared by incorporating the tetrafluoroethylene polymer in the form of powder.

The invention relates to thermoplastic moulding compositions consisting of:

A. 65–97, preferably 80–95 and especially 82–90, % by weight of a polyamide and

B. 3–35, preferably 5–20 and particularly preferentially 10–18, % by weight of a graft rubber having a gel content of at least 50% by weight, preferably 80% by weight and especially at least 90% by weight, and a glass transition temperature below $-20°$ C., the sum of the components being 100% by weight, containing 0.1–1% by weight, preferably 0.25–0.8% by weight, relative to the total of A+B, of a tetrafluoroethylene polymer.

The invention also relates to a process for the preparation of the moulding compositions which is characterised in that (a) an aqueous, finely particulate dispersion of a graft polymer B is first mixed with a dispersion of a tetrafluoroethylene polymer having an average particle size of 0.05–20 μm, in such a way that the ratio by weight of graft polymer B to tetrafluoroethylene polymer is between 80:20 and 99:1, (b) the polymers are isolated from this mixture by coagulation and are dried, and (c) the resulting mixture, if appropriate after granulation, is mixed in the melt with polyamide, if appropriate further graft polymer and, if appropriate, additives.

Suitable polyamides A are all thermoplastic polyamides, preferably partly crystalline polyamides. Thus it is possible to employ, as partly crystalline polyamides, Polyamide 6, Polyamide 66 or copolymers thereof, or polymers in which the acid component consists wholly or partly of terephthalic acid and/or isophthalic acid and/or suberic acid and/or sebacic acid and/or azelaic acid and/or adipic acid and/or cyclohexanedicarboxylic acid and in which the diamine component consists wholly or partly of m-xylylenediamine and/or p-xylylenediamine and/or hexamethylenediamine and/or 2,4,4-trimethylhexamethylenediamine and/or isophoronediamine.

Suitable polyamides are, additionally, those which have been prepared from lactams having 6–12 C atoms using concomitantly one or more of the starting components mentioned above. Partly crystalline polyamides which are particularly preferred are polyamide 6 and polyamide 66.

The polyamides preferably have a relative viscosity (measured on a 1% strength by weight solution in m-cresol at 25° C.) of 2.0–5.0, particularly preferably 2.5 to 4.0.

Preferred graft rubbers B have an average particle diameter $d_{50}$ of 0.05 to 1, preferably 0.1 to 0.8 and especially 0.2 to 0.8 μm.

The average particle diameter $d_{50}$ is the diameter above which and below which 50% by weight of the particles lie in each case. It can be determined by means of ultracentrifuge measurement (W. Scholtan, H. Lange, Kolloid. Z. und . Polymere 2.0 (1972), 782–796) or by means of electron microscopy and subsequent counting of particles (G. Kämpf, H. Schuster, Angew. makromolekulare Chemie, 14, (1970), 111–129) or by measurement of light scattering.

The graft rubbers B are crosslinked and have a gel content of at least 50% by weight, preferably at least 80% by weight and especially at least 90% by weight, relative to B.

The gel contents of the crosslinked diene rubber, are determined at 25° C. in toluene, while the gel contents of the crosslinked acrylate rubbers are determined at 25° C. in dimethylformamide (M. Hoffmann, H. Krämer, R. Kuhn, Polymeranalytik ("Analysis of polymers") I and II, Georg Thieme Verlag, Stuttgart 1977).

Preferred graft rubbers B are graft polymers containing 15–60, preferably 20 to 50 and especially 25 to 40, % by weight of at least one vinyl or vinylidene monomer preferably belonging to the series comprising styrene, α-methylstyrene, acrylonitrile, $C_1$–$C_8$-alkyl acrylate, $C_1$–$C_8$-alkyl methacrylate, hydroxy-$C_2$–$C_8$-alkyl (meth)acrylate or epoxy-$C_2$–$C_8$-alkyl (meth)acrylate, on 40 to 85, preferably 50 to 80 and especially 60 to 75, % by weight of a particulate, crosslinked diene or acrylate rubber.

The graft monomers can be grafted onto the graft rubber base individually or as mixtures. Preferred graft monomers are methyl methacrylate and mixtures of styrene and methyl methacrylate in a ratio of 10:90 to 50:50 and mixtures of styrene and acrylonitrile in a ratio of 90:10 to 50:50.

Preferred diene rubbers are crosslinked homopolymers and/or copolymers formed from conjugated $C_4$–$C_6$-dienes. The preferred diene is 1,3-butadiene. In addition to the diene radicals, the diene copolymers can contain up to 30% by weight, relative to the diene copolymer, of radicals of other ethylenically unsaturated monomers, such as, for example, sytrene, acrylonitrile or esters of acrylic or methacrylic acid with monohydric $C_1$–$C_4$-alcohols, such as, for example, methyl acrylate, ethyl acrylate, methyl methacrylate (sic) or ethyl methacrylate.

The preparation of the diene rubbers as a graft base and of the graft rubbers is described, for example, in "Methoden der Organischen Chemie" ("Methods of Organic Chemistry") (Houben-Weyl), volume 14/1, Georg Thieme Verlag, Stuttgart 1961, pages 393–406, and in Ullmanns Encyclopädie der technischen Chemie ("Ullmann's Encyclopedia of industrial chemistry"), 4th edition, volume 19, Verlag Chemie, Weinheim, 1981, pages 279–284.

The products described in DE-OS (German Published Specification) No. 2,742,176 are preferred as graft rubbers.

Preferred graft bases based on acrylate rubber are homopolymers of $C_1$–$C_8$-alkyl acrylates and copolymers of these alkyl acrylates with up to 40% by weight, relative to the copolymer, of other vinyl monomers, such as styrene, acrylonitrile, methyl methacrylate, vinyl esters or vinyl ethers.

In general, the acrylate rubbers are chemically crosslinked, for which purpose it is preferable to copolymerise small amounts of crosslinking monomers having more than one copolymerisable double bond. Examples of suitable monomers are esters of unsaturated $C_3$–$C_{12}$-monocarboxylic acids and unsaturated, monohydric $C_2$–$C_{12}$-alcohols or saturated $C_2$–$C_{20}$-polyols having 2 to 4 OH groups, and also polyunsaturated heterocyclic compounds, for example trivinyl (sic), triallyl cyanurate and triallyl isocyanurate; in particular triallyl cyanurate; polyfunctional vinyl compounds, such as divinyl benzenes and trivinylbenzene; and also triallyl phosphate.

Preferred crosslinking monomers are allyl methacrylate, ethylene glycol (sic) dimethacrylate, diallyl phthalate and heterocyclic compounds containing at least three copolymerisable ethylenically unsaturated double bonds.

Crosslinking monomers which are particularly preferred are the cyclic monomers triallyl cyanurate, triallyl isocyanurate, trivinyl cyanurate, trisacryloylhexahydro-s-triazine and triallylbenzenes.

The amount of the crosslinking monomers is preferably 0.02–5, in particular 0.05–2, % by weight, relative to the rubber graft base.

In the case of cyclic, crosslinking monomers having at least three ethylenically unsaturated double bonds, it is advantageous to use not more than 1% by weight, relative to the rubber graft base.

Acrylate rubbers can, in turn, also be graft polymers having a multi-shell structure and containing a crosslinked diene rubber consisting of one or more conjugated dienes, such as polybutadiene, or a copolymer of a conjugated diene with an ethylenically unsaturated monomer, such as styrene and/or acrylonitrile, as the core and acrylate monomer, attached by polymerisation, as the shell.

The content of polydiene core in such multi-shell rubbers can be 0.1–80, preferably 10–50, % by weight. Independently of one another, the shell(s) and core can be partly crosslinked or highly crosslinked.

Preferred grafted acrylate rubbers are those which
(a) have been crosslinked with cyclic trifunctional comonomers, such as triallyl cyanurate and triallyl isocyanurate, (described in DE-OS (German Published Specification) No. 3,006,804) and
(b) contain a polybutadiene core (described in DE-OS (German Published Specification) No. 3,200,070).

In the preparation of the graft rubbers B by graft copolymerisation, which is usually carried out in the presence of free-radical initiators, for example water-soluble initiators, emulsifiers or complex-formers/graft activators, and also regulators, in addition to the actual graft copolymer, free polymers and/or copolymers of the graft monomers forming the graft shell are generally also formed to a certain extent.

Graft rubber B as defined by the invention is, therefore, the product obtained by polymerising graft monomers in the presence of the rubber latex.

The moulding compositions according to the invention have optimum properties if the amount of free (co)polymer in the graft product B does not exceed 15% by weight, preferably 10% by weight and especially 7% by weight, relative to B. The Staudinger index of these free (co)polymers should be less than 0.6 dl/g, preferably less than 0.4 dl/g, measured in dimethylformamide at 25° C.

Particularly preferred graft rubbers are described, for example, in DE-OS (German Published Specification) Nos. 2,742,176, 2,941,025, 3,151,441 and 3,200,070 and in EP-A No. 34,748.

The tetrafluoroethylene polymers which are suitable according to the invention are polymers having a fluorine content of 65–76% by weight, preferably 70–76% by weight. Examples are polytetrafluoroethylene, tetrafluoroethylene/hexafluoropropylene copolymers or tetrafluoroethylene copolymers containing small amounts of fluorine-free, copolymerisable, ethylenically unsaturated monomers. The polymers are known. They are employed in the form of a highly particulate aqueous dispersion having a solids content between 30 and 60% by weight. The particle size of the dispersion is 0.05–20 μm, preferably 0.08–10 μm. (See "Vinyl and Related Polymers" by Schildknecht, published by John Wiley & Sons, Inc., New York, 1952, pages 484–494; "Fluorpolymers" by Wall, published by Wiley-Interscience, Division of John Wiley & Sons, Inc., New York, 1972; "Encyclopedia of Polymer Science and Technology", published by Interscience Publishers, Division of John Wiley & Sons, Inc., New York, volume 13, 1970, pages 623–654; "Modern Plastics Encyclopedia", 1970–1971, volume 47, No. 10 A, October 1970, published by McGraw-Hill, Inc., New York, pages 134, 138 and 774; "Modern Plastics Encyclopedia", 1975–1976, October 1975, volume 52, No. 10 A, published by McGraw-Hill, Inc., New York, pages 27, 28 and 472 and U.S. Pat. Nos. 3,671,487, 3,723,373 and 3,838,092).

According to the process for preparing the polyamide moulding compositions according to the invention the graft polymers containing polytetrafluoroethylene can be prepared by mixing aqueous dispersions of the tetrafluoroethylene polymer with aqueous dispersions of the graft polymer, optionally a vinyl polymer, in a ratio of 20:80 to 1:99 and isolating this mixture in a known manner by coagulation and then washing and drying it. Electrolyte solutions, preferably aqueous solutions of MgSO4 (bitter salt) and acetic acid of pH 4-5 are, for example, suitable for the coagulation. The mixtures of tetrafluoroethylene polymers and graft polymers obtained in this way are used, optionally mixed with other graft polymers, for the preparation of the polyamide moulding compositions.

The moulding compositions according to the invention can contain customary additives, such as lubricants and demoulding agents, nucleating agents, stabilisers, fillers and reinforcing materials, flame retardants and dyestuffs.

The moulding compositions can contain up to 60% by weight, relative to the reinforced moulding composition, of fillers and/or reinforcing materials. Preferred reinforcing materials are glass fibers. Preferred fillers, which can also have a reinforcing action, are glass beads, mica, silicates, feldspar, quartz, talc, titanium dioxide and wollastonite.

All the known flame retardants, such as, for example, cyclic chlorine compounds, melamine and salts thereof, such as melamine cyanurate or melamine sulphate, and/or red phosphorus, can be used for imparting a flame-retardant finish.

The mixtures of polyamide A and graft rubber B can be produced in the customary mixing units, such as mixing rolls, kneaders or single-screw and multi-screw extruders. In the production of the mixtures, the temperature should be at least 10° C. and preferably not more than 90° C. above the melting point of the polyamide.

EXAMPLES

A. Polyamide 6 having a relative viscosity (measured on a 1% strength by weight solution in m-cresol at 25° C.) of 3.5.

B. Graft polymer, 80% by weight of graft base consisting of crosslinked polybutadiene (gel content over 70% by weight, measured in toluene) and 20% of grafted-on material consisting of methyl methacrylate.

C. Mixture consisting of 95% by weight of graft polymer according to B and 5% by weight of polytetrafluoroethylene having a fluorine content of 74% by weight.

Preparation of the mixture of graft polymer and tetrafluoroethylene polymer (component C).

100 parts of a 40% strength by weight aqueous dispersion of the graft polymer B and 3.5 parts of a tetrafluoroethylene polymer dispersion having a solids content of 60% by weight and a fluorine content, relative to the solid, of 73.7% by weight (Teflon 30N made by Dupont) are mixed and stabilised with 1.8% by weight, relative to polymer solids, of phenolic antioxidants.

The mixture is coagulated at 85°–95° C. by means of an aqueous solution of MgSO4 (Epsom salt) and acetic acid at pH 4-5, and the product is filtered off and washed until it is virtually free from electrolytes, then freed from the bulk of the water by centrifuging and then dried at 100° C. to give a powder.

PREPARING AND TESTING THE MOULDING COMPOSITIONS

The components were melted and homogenised on a continuously operating twin-screw extruder. The cylinder temperatures were selected so as to maintain composition temperatures of 260°–280° C. The melt ribbon was degassed before emerging from the nozzle and was cooled in water, granulated and dried.

ASTM bars were injection-moulded from the moulding compositions on a conventional injection moulding machine (composition temperature 260° C., mould temperature 80° C.). Tests were made of the notched impact strength (by the Izod method) at the temperatures indicated and also of the dimensional stability under heat (Vicat softening point as specified in DIN 53,460, method B) and the heat of fusion as measured by the DSC method at a heat-up rate of 20° C./minute (see Table 1).

In order to measure the demoulding behaviour of the moulding compositions, a slightly conical cylinder was injection-moulded. The larger external diameter of the cylinder was 43 mm, the smaller external diameter was 39 mm, the wall thickness was 3 mm and the height of the cylinder was 35 mm. These cylinders were injection-moulded continuously, and the core temperature was increased slowly, starting from 60° C. The force which had to be applied by the demoulding pins in order to release the part from the mould was determined as a function of the temperature. Usually, this pressure is virtually constant up to a critical temperature of the mould. Above a certain temperature, the demoulding force suddenly increases considerably. This temperature is the adhesion temperature of the composition. It determines the cycle time very decisively (see Table 1).

TABLE 1

| Example | Component (% by weight) A | B | C | Minimum demouldability (bar) | Adhesion temperature (°C.) | Izod at −20° C. (J/m) | Vicat B (°C.) |
|---|---|---|---|---|---|---|---|
| 1[1] | 80 | 20 | — | 30 | 85–90 | 250 | 170 |
| 2[1] | 70 | 30 | — | 20 | 80–85 | 700 | 150 |
| 3 | 80 | — | 20 | 35 | 95–100 | 800 | 200 |
| 4 | 70 | — | 30 | 22 | 80–85 | 700 | 155 |

[1]Comparison examples

We claim
1. A thermoplastic moulding composition comprising
   A. 65 to 97% by weight of a polyamide and
   B. 3 to 35% by weight of a graft rubber having a gel content of at least 50% by weight and a glass transition temperature below −20° C., the sum of components A and B being 100% by weight; and containing 0.1 to 1% by weight relative to the sum of A+B, of a tetrafluoroethylene polymer.

2. A moulding composition according to claim 1, comprising, as component A, 80 to 95% by weight of the polyamide and, as component B, 5 to 20% by weight of the graft rubber.

3. A moulding composition according to claim 1, in which the graft rubber has a gel content of at least 90% by weight.

4. A moulding composition according to claim 1, containing 0.25 to 0.8% by weight, relative to the sum of A+B, of the tetrafluoroethylene polymer.

5. A moulding composition according to claim 1, in which the polyamide is polyamide 6 or polyamide 66.

6. A moulding composition according to claim 1, in which the graft rubber of component B comprises a graft rubber base onto which is grafted methyl methacrylate, a mixture of styrene and methyl methacrylate in a ratio of 10:90 to 50:50 or a mixture of styrene and acrylonitrile in a ratio of 90:10 to 50:50.

7. A moulded article whenever produced from a moulding composition according to claim 1.

* * * * *